July 30, 1968  H. LEU ETAL  3,394,743
MACHINE FOR CUTTING BOARDS INTO FINITE SECTIONS FOR
PRODUCING PARQUET STRIPS AND THE LIKE
Filed March 7, 1966  2 Sheets-Sheet 2

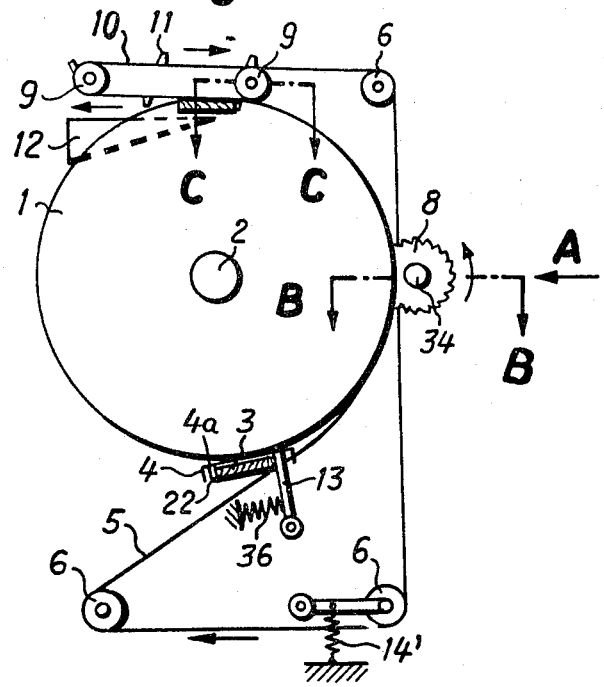
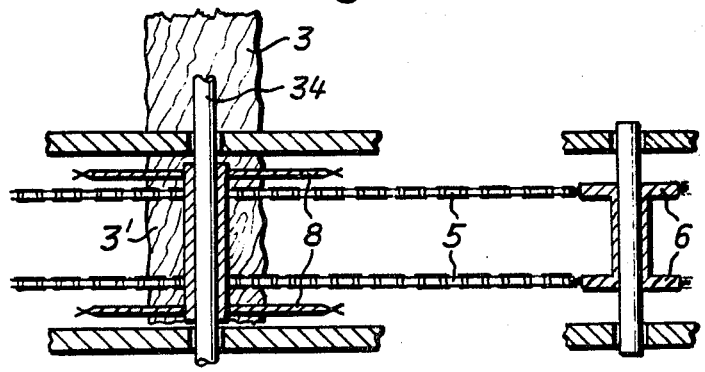

INVENTORS
Herbert Leu and
Tuomas Aaltonen
BY
Werner W. Kleeman
Their Attorney

United States Patent Office 3,394,743
Patented July 30, 1968

3,394,743
MACHINE FOR CUTTING BOARDS INTO FINITE SECTIONS FOR PRODUCING PARQUET STRIPS AND THE LIKE
Herbert Leu, St. Margrethen, and Tuomas Aaltonen, Schwerzenbach, Switzerland, assignors to Firma Bauwerk AG, St. Margrethen, Switzerland, a Swiss corporation
Filed Mar. 7, 1966, Ser. No. 532,145
Claims priority, application Switzerland, Mar. 8, 1965, 3,153/65
8 Claims. (Cl. 143—33)

ABSTRACT OF THE DISCLOSURE

A machine for cutting sections from lengthy rough boards for the production of parquet strips. The machine comprises, in combination, a rotatable drum member, means for supporting the rough boards at the drum member, cutting saw means adjacent the rotatable drum member for cutting sections from the lengthy rough boards, and at least one endless, displaceable clamping member bearing against the lengthy rough boards at the region of which there is to be cut a section therefrom.

---

The present invention pertains to an improved machine for cutting sections from lengthy rough planks or boards for the purpose of producing parquet strips and is of the type incorporating cutting saw means, a rotatable drum member, holding or supporting means for the rough boards, and at least one clamping member such as a chain or band bearing against the aforesaid board.

In such machines having a rotatable drum member the problem exists of positively clamping the rough boards during the cutting operation in clamping tongs or mechanism revolving with the aforesaid drum member. However, in doing such, the clamping force which can be exerted at the wooden member is limited if the wood is not to become damaged. On the other hand, the forces exerted by the circular saw blades upon the wood pieces are quite considerable, particularly if the wood contains knots or the like. It has already been proposed to additionally press the entrained rough board against the drum member during processing by means of stationary, flexible chain means. This technique, however, has been found to be disadvantageous because the wooden sections or pieces are damaged at the edges so that waste or reject occur at the parquet strips. It has further been found that such stationary chains heat up considerably due to the friction of the wooden pieces moving therepast and if such chains are tightened or tensioned to such an extent that the rough boards are positively held in the clamping tongs. On the other hand, if the chain tension is lax, the danger exists that the boards will be ripped out of the clamping locations by the circular saw blades.

Now, a primary object of the present invention is to effectively overcome the aforementioned disadvantages of prior art structures.

Another, more specific object of this invention has reference to an improved machine for cutting up boards into parquet strips and wherein the boards are effectively clamped during the cutting operation to provide substantially parallel cut edges and without damaging the wood.

Still a further, noteworthy object of this invention concerns itself with an improved clamping arrangement for a machine for cutting boards and the like into sections of predetermined size and where the clamping arrangement performs its operation first after the board is properly aligned and then retains such in the correct position throughout the cutting operation, without damaging the wood, and upon completion thereof assists in transfer of the cut section to a removal location.

Broadly speaking, the inventive machine incorporates a clamping chain or clamping band which is of endless construction and guided about a plurality of deflecting rollers or the like. As a result, it is possible by very simple means to obtain positive clamping of the wooden pieces while preventing damage to the edges of the wood. At the same time, favorable conditions are attained for automation of the fabrication of parquet strips or the like because the removal and further conveyance of the cut wood sections takes place at a specific location and the cut surfaces serve as reference surfaces for further processing. Consequently, there is prevented dropping of the board into a random position and the subsequent new alignment in the same position.

Other features, objects and advantages of the invention will become apparent by reference to the following detailed description and drawings in which:

FIGURE 1 is a schematic top plan view of a preferred embodiment of inventive machine of the type described;

FIGURE 2 is a side view of the machine of FIGURE 1, as viewed in the direction of arrow A thereof, and depicting only a fragmentary portion of same;

Figure 3:
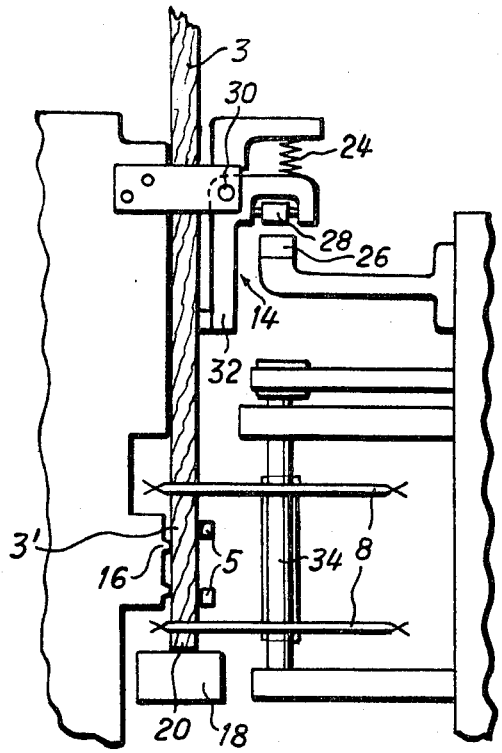
FIGURE 3 is an enlarged cross-sectional view of the machine of FIGURE 1, taken along the line B—B thereof.
Figure 4:
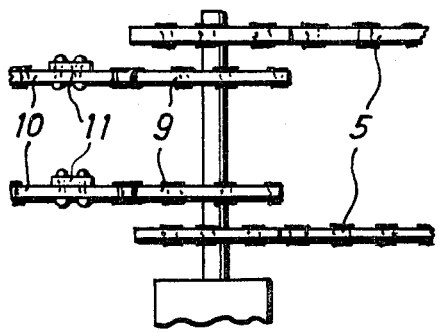
FIGURE 4 is an enlarged cross-sectional fragmentary view of the machine of FIGURE 1, taken along the line C—C thereof and showing the arrangement of the deflecting wheels for the clamping chains and the cooperation of the latter with the removal chains.

Describing now the drawings, and initially turning attention to the exemplary embodiment of machine depicted in FIGURE 1, it will be understood that such is provided for the purpose of cutting sections from rough boards or the like in order to produce parquet strips. Under the term "rough boards" there is to be understood lengthy, dried planks or boards of different types of wood suitable for production of inlaid floors or parquets. The machine itself embodies a drum member 1 rotatably mounted upon a shaft 2. This shaft 2 and therefore also the rotatable drum member 1 are preferably somewhat inclined with respect to the vertical so that the rough planks, prior to clamping, come to bear under their own weight against a surface of the associated open-ended U-shaped channel 4a of the relevant clamping station 4. It will be understood that at the periphery of this rotatable drum member 1, a plurality of such clamping stations 4 are provided, for instance nine uniformly distributed U-shaped channels 4a having each associated therewith a clamping tong arrangement or mechanism 14 to be considered in greater detail shortly. For purposes of simplifying the illustration of the drawings only one such U-shaped channel 4a has been shown and which receives a given rough board 3. When located in its channel 4a, the lengthwise axis of the board 3 is situated approximately parallel to the rotational axis of the drum member 1.

As best seen by referring to FIGURE 2, from each such rough board or plank 3 there is cut off a finite length section 3' with the aid of two spaced and coaxially arranged circular saw blades 8 or equivalent cutting structure. The cutting operation takes place during rotation of the drum member 1 and when the board 3 located in its channel 4a passes the aforementioned circular saw blades 8. As will be explained in considerable detail hereinafter, after removal of the cut section 3' the associated clamping tong arrangement 14 (FIGURE 3) is released and the board 3, in each instance, slides downwards a distance corresponding to the height of the severed sections 3', and during the course of rotation of the drum member 1 is again fixedly clamped, and finally, by means of the motor-driven circular saw blades 8 seated upon a shaft 34 parallel to the axis of rotation of the drum member 1, a further section 3' is cut, and this cutting operation repeated until the entire length of board 3 has been cut into individual sections 3'.

Each clamping station 4, as already developed, embodies a U-shaped channel 4a extending from the top towards the bottom, yet preferably stopping or terminating above the upper circular saw blade 8 to enable unhampered cutting thereby, as well as movable, cam-controlled clamping tong arrangement 14 for fixedly clamping the board 3 above the section to be cut. Since such boards, by virtue of the drying operation, have the tendency to distort and are crooked or warped, they must be newly clamped before each cutting operation in order that the cut surfaces extend as much as possible at right-angles to the longitudinal front face of the section, since such is important with regard to the subsequent working operations typically carried out during parquet manufacturing. It will be seen from FIGURE 3 that a stop 18 is arranged somewhat beneath the lowermost circular saw blade 8, so that two exactly parallel cut surfaces appear at each cut section 3'. The waste or remainder 20 then falls away by virtue of the inclination of the drum member 1.

In order to prevent the boards from being torn out of the associated clamping tong arrangement 14 during processing by both of the circular saw blades 8 there are provided two spaced and parallely moving tensioning or clamping chains 5 arranged between both circular saw blades 8 and bearing from the outside against the longitudinal face of the section 3'. After cutting, the sections 3' are thus only pressed by the clamping chains 5 against their support surface 16. In the event the remaining section of board 3 is too short, then it can no longer be engaged by the chains 5 and therefore falls away or is rejected due to the inclination of the drum member 1. Both of these clamping chains 5 do not have their own drive, rather are entrained by the boards and the cut sections at such time as they are revolved along with the drum member 1, so that these chains 5 have the same circumferential or revolving velocity. These chains 5 extend substantially parallel to one another, are endless, and guided over four deflecting or turning rollers 6 or equivalent structure. As a result, each of the chains 5 is wrapped about one-third to one-half of the circumference of the drum member 1. As shown, at least one of these deflecting rollers 6 is loaded by a relatively strong spring member 14' producing the required chain tension, and additionally, with different board thicknesses or in the event one of the clamping stations 4 is not charged, provides the required compensation for the chain length.

In order to align each board 3 with regard to its narrow side and prior to the clamping operation, there is provided a movable lever member 13 which presses such board against an impact or stop surface 22 located at the region of the aforesaid narrow side. Thereafter, the chains 5 bear against the board and then the clamping tong arrangement 14 is closed by the spring 24 depicted in FIGURE 3. This clamping tong arrangement 14 is opened by a cam track 26 and is held open by such also. To this end, the cylindrical roller 28 rolls upon the cam track 26 and brings about the lever 32 pivotable about the bolt member 30 is held in spaced relationship from the associated board 3, so that the latter can slide into the zone where the chain members 5 do not bear.

As soon as the lever member 13 has pressed the board 3 against the lateral impact surface 22 with the help of the spring 36, then this board is engaged by the chain members 5 and fixedly held in position relative to the associated clamping station 4. The returning run of the chain or chains 5 is passed between both of the circular saw blades 8 (FIGURE 1).

After the section 3' has been severed or cut from the remainder of the board 3 by the circular saw blade 8, the chains 5 again release such sections 3' at the outlet side, that is, behind the aforesaid circular saw blade 8, and such cut section 3' is transferred and entrained by a second pair of endless chain members 10 by means of the entrainment members 11 carried thereon. This second pair of chains 10 is driven in synchronism with the drum member 1 by sprocket wheels 9 independently of the chains 5. The entrainment members 11 riveted, or otherwise affixed, to the chains 10 are arranged and adjusted relative to the clamping stations 4 such that they come to bear in each instance behind a severed section 3', entrain such and remove it tangentially with respect to the drum member 1. So as to positively transfer the sections 3' from the clamping stations 4 to the entrainment members 11 of the second pair of chains 10, there is provided a stationary wedge unit 12 engaging behind each such cut section 3'. Cooperating with the entrainment chain unit 10 are preferably further non-illustrated conveying means, for instance a vertical conveyor mechanism which transports these sections 3' to further processing stations. Of course, instead of providing the depicted flexible endless chains, particularly defining the clamping chains 5, it would also be possible to use endless bands, preferably formed of steel.

While there is shown and described a present preferred embodiment of the invention, it is to be distinctly understood that the inevntion is not limited thereto but may be otherwise variously embodied and practised within the scope of the following claims.

What is claimed is:

1. Machine for cutting sections from lengthy rough boards for the production of parquet strips comprising, in combination, a rotatable drum member, means for supporting the rough boards at said drum member, cutting saw means adjacent said rotatable drum member for cutting sections from said lengthy rough boards, and at least one endless, displaceable clamping member bearing against the lengthy rough board at the region of which there is to be cut a section therefrom.

2. Machine for cutting sections from lengthy rough boards as defined in claim 1, wherein said endless, displaceable clamping member is an endless chain.

3. Machine for cutting sections from lengthy rough boards as defined in claim 1, further including a plurality of deflecting roller members about which is guided said endless, displaceable clamping member.

4. Machine for cutting sections from lengthy rough boards as defined in claim 1, wherein two endless, displaceable clamping members are provided each of which is an endless chain, wherein both extend in substantial parallelism with one another, said cutting saw means comprising a pair of spaced circular saws, said two endless chains extending between said pair of circular saws and over a portion of the circumference of said rotatable drum member.

5. Machine for cutting sections from lengthy rough boards as defined in claim 2, including at least one further chain member provided with entrainment means arranged at the outlet side of said cutting saw means with respect to the direction of rotation of said rotatable drum member in order to receive and tangentially remove the cut sections.

6. Machine for cutting sections from lengthy rough boards as defined in claim 5, wherein said further chain member provided with said entrainment means is driven in synchronism with said rotatable drum member.

7. Machine for cutting sections from lengthy rough boards as defined in claim 1, wherein said supporting means incorporates lateral impact surface means, a movably mounted lever member for urging said lengthy rough board to bear with its narrow side against said lateral impact surface means directly prior to clamping of said lengthy rough board by said endless, displaceable clamping member.

8. Machine for cutting sections from lengthy rough boards as defined in claim 2, said supporting means for said rough boards including a clamping arrangement disposed above said chain member, said clamping arrangement and said chain member being positioned with respect to said cutting saw means such that a piece of rough board which is too short is automatically rejected.

References Cited

UNITED STATES PATENTS 2,983,295  5/1961  Tibbals.

WILLIAM W. DYER, JR., *Primary Examiner.*

W. D. BRAY, *Assistant Examiner.*